Figure 1:
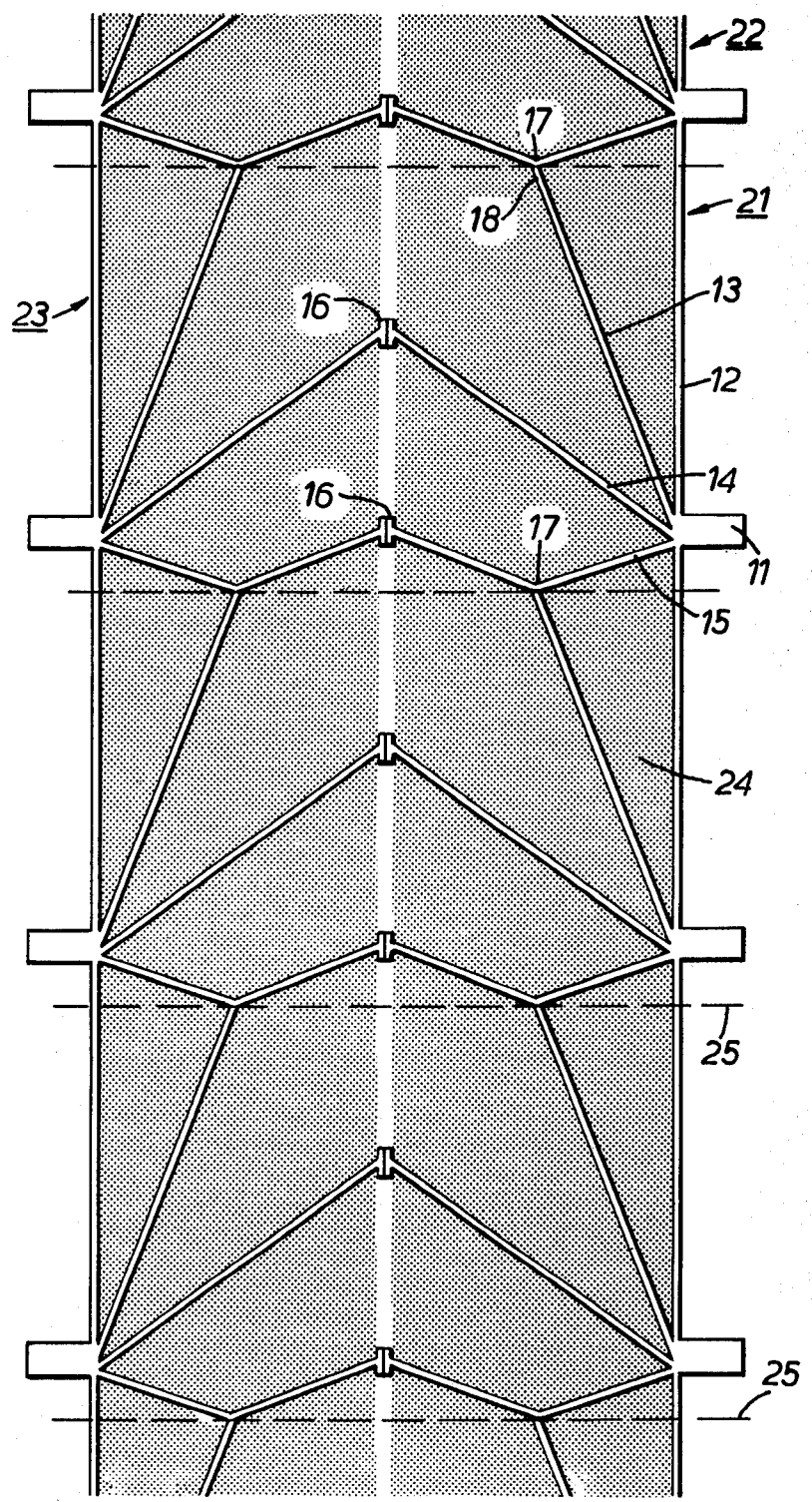

United States Patent [19]

Fletcher et al.

[11] Patent Number: 4,469,145

[45] Date of Patent: Sep. 4, 1984

[54] METHOD OF MAKING BATTERY PLATES

[75] Inventors: Norman W. Fletcher, Manchester; Geoffrey J. May, Warrington, both of England

[73] Assignee: Chloride Group Limited, London, England

[21] Appl. No.: 293,306

[22] Filed: Aug. 17, 1981

[30] Foreign Application Priority Data

Aug. 21, 1980 [GB] United Kingdom ................ 8027267

[51] Int. Cl.³ ........................... B65B 3/04; H01L 2/00
[52] U.S. Cl. ........................................ 141/1.1; 29/2; 29/623.5; 429/241
[58] Field of Search ............... 429/211, 233, 241, 242, 429/243; 29/623.5, 2; 141/1.1, 32, 33

[56] References Cited

U.S. PATENT DOCUMENTS 3,808,054 4/1974 Wheadon et al. ................ 429/211

4,271,586 6/1981 McCartney ....................... 429/241

FOREIGN PATENT DOCUMENTS 2057921 4/1981 United Kingdom ............... 429/242
2057920 4/1981 United Kingdom ............... 429/242

Primary Examiner—Houston S. Bell, Jr.
Attorney, Agent, or Firm—Oblon, Fisher, Spivak, McClelland & Maier

[57] ABSTRACT

This invention is a method of making negative battery plates in a continuous process, in which a skeletal grid is cast continuously to have the structure of a number of plate grids side by side and longitudinally integrally connected together in the casting. After casting the skeletal grid is pasted, tissues are applied on either side, and then the grid is cut by slitting and transversely to separate the composite grid into separate pasted battery plates.

5 Claims, 2 Drawing Figures

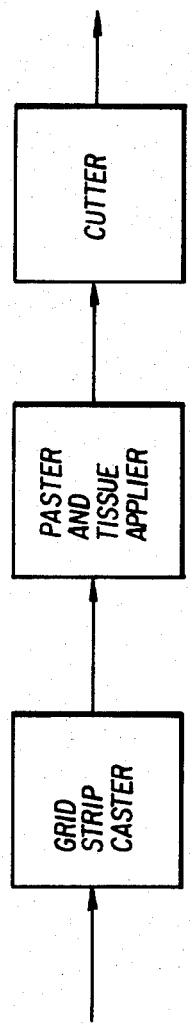

METHOD OF MAKING BATTERY PLATES

This invention relates to a method of making battery plates, for example, plates of the "Crow's Foot" type which use a minimum of lead alloy for connecting the active material to a connection lug, the lead alloy being in the form of bars extending generally radially from the lug.

One object of the invention is to provide a quick mass production method of making such battery plates.

According to the invention, in a method of making battery plates, a skeletal grid is cast continuously and cut transversely to, and parallel with the direction of casting into individual plates, each plate having a number of bars radiating from a connection lug and the bars of one plate being united in the cast skeletal grid before cutting with the bars of adjacent plates, both in the casting direction, and side by side.

The grid may be pasted conventionally, preferably before cutting, which preferably is performed after glass fibre tissues have been applied on opposite sides of the pasted Crow's Foot.

The invention includes a Crow's Foot connection structure for a battery plate comprising a number of bars radiating from a connection lug, a bar at one end of the connector having an elbow aligned with the end of another bar at the other end of the plate, so that a line of such connectors can be continuously cast in a line being united by the elbow being integral with the end of the bar on the next connector. Also there may be at least two bars terminating in the edge opposite the lug so that in a continuously cast grid two such connectors can be united side by side at the ends of those bars.

Each plate can have a minimum of lead alloy constituting the connector bars, and the lug, and yet during production and pasting, the skeletal grid can be reasonably rigid because of the connection of each connector with its neighbours both side by side and longitudinally. Also production can be by a mass production method because a continuous line of side by side connectors can be cast continuously, pasted continuously, have continuous glass fibre tissues applied on either side, and can be cut into individual plates in one continuous operation. The cutting can consist of a longitudinal slitting to separate side by side plates, and a periodical transverse cutting into longitudinally separated plates.

The invention may be carried into practice in various ways, and one embodiment will now be described by way of example, with reference to the accompanying drawings, of which:

FIG. 1 is a plan view of a skeletal grid in the course of producing battery plates by a mass production method; and FIG. 2 is a schematic illustration of the steps in the mass production method.

The connector for each plate is cast with an external connection lug 11, a longitudinal top bar 12 extending to either side of the lug 11, three bars 13, 14 and 15 radiating from the lug 11, and two feet 16 on the ends of the bars 14 and 15. The leading bar 15 has an elbow 17 which is aligned over the depth of the connector with the end 18 of the bar 13.

The figure shows that that particular form of grid connector is suitable as one component of a continuous skeletal grid made up from a number of similar connectors.

Thus, the end 18 of the bar 13 in one connector 21 is united with the elbow 17 in the longitudinally adjacent connector 22, and the feet 16 of the connector 21 are united with the feet 16 of a side by side adjacent connector 23.

The complete skeletal grid can be continuously cast, preferably by means of a roller with the form of two side by side connectors cut as mould recesses in its cylindrical surface.

After continuous casting the skeletal grid is pasted as indicated by the shading 24 in the figure, with pasting being omitted along the line of the feet 16 between side by side adjacent pairs of grids, and glass fibre tissues are applied on either side of the pasted grid to retain the past in position around the connector bars.

Finally, the pasted and tissued grid is slit longitudinally along the line separating the feet 16, and is periodically cut transversely along the dotted lines 25 to form individual negative battery plates. The feet 16 are formed with a local neck between the feet of adjacent side by side grids so that the longitudinal slitting is made easy.

The top bar 12 could be omitted in some cases, while the skeletal grid would still be reasonably rigid because of the longitudinal connections at 17, 18. Also in some cases it may not be necessary to have feet 16; instead the ends of the legs 14 and 15 in adjacent side by side pairs could be simply cast together with a local neck between them.

It might be possible to cast the skeletal grid continuously onto one side of a continuous glass fibre tissue rather than applying the tissues subsequently to casting of the skeletal grid.

We claim:

1. A method of making battery plates, said method comprising the steps of:
   continually casting a skeletal grid in the form of two parallel lines of plate grids, each grid having a plurality of bars radiating from a connection lug, each of the bars of one line of plate grids being united with the bars of the adjacent plate in the other of the parallel lines, and also being united with the bars of the adjacent plates in the same line; and
   cutting the cast grid transversely to, and parallel with, the direction of the parallel lines, so as to form individual plates.

2. The method as claimed in claim 1 in which the skeletal grids are cast continuously, said method including the steps of continuously pasting said cast grids and applying continuous glass tissues on either surface of the pasted skeletal grid, said pasting and tissue applying steps being performed on said cast grids before each line is cut into individual plates.

3. A method as claimed in claim 1 in which the grid is pasted with battery active material before said cutting step.

4. A method as claimed in claim 1 or 2, in which tissues are applied on opposite sides of the pasted grid before said cutting step.

5. A method as claimed in claim 2 in which said cutting step consists of longitudinal slitting of said lines into separate side by side plates, and periodical transverse cutting of said separate lines into longitudinally separated plates.

* * * * *